Nov. 2, 1954
J. B. GAUT ET AL
2,693,070
TOBACCO HARVESTER
Filed Jan. 14, 1952
5 Sheets-Sheet 2
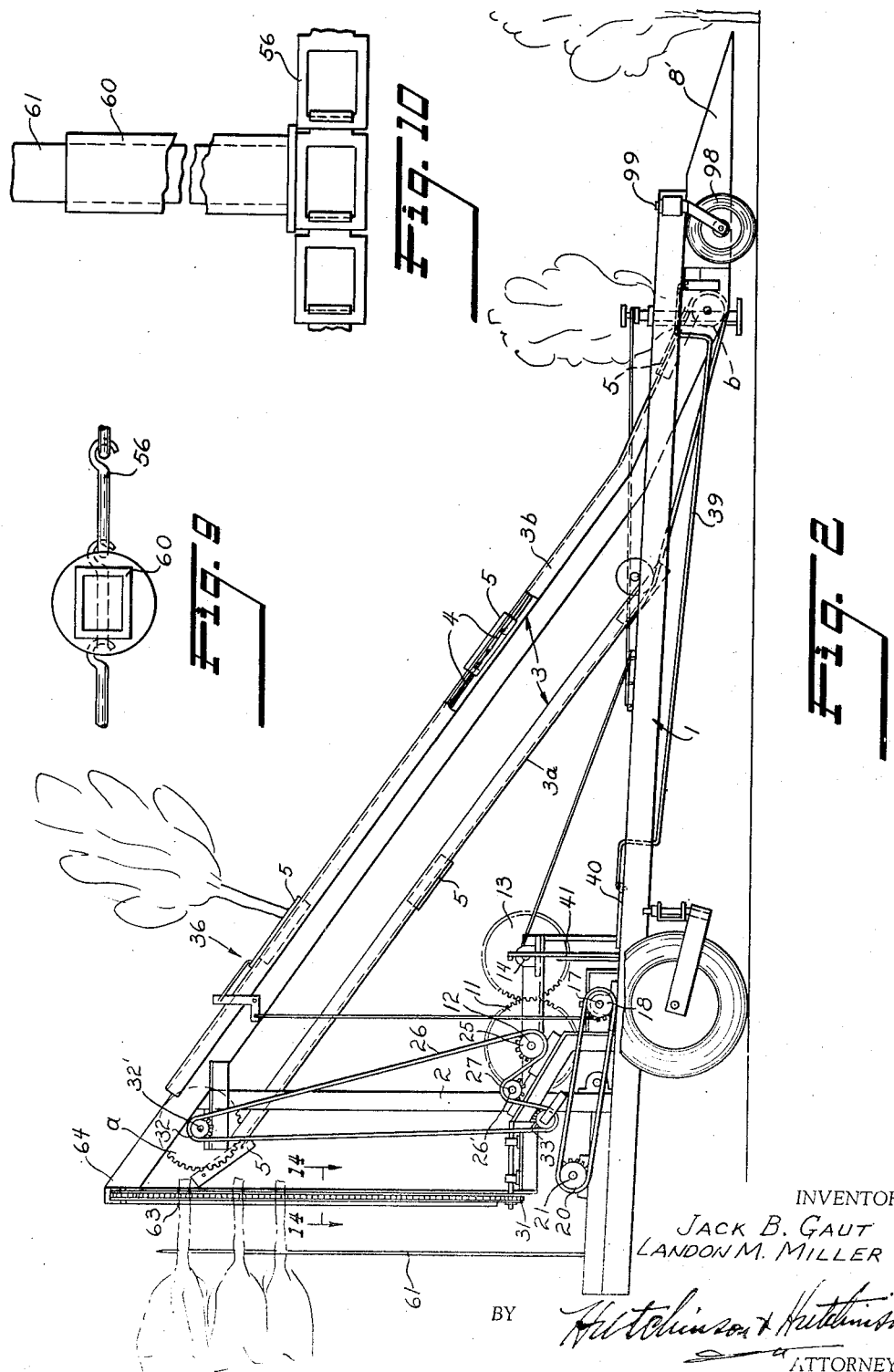
INVENTOR
JACK B. GAUT
LANDON M. MILLER
BY Hutchinson & Hutchinson
ATTORNEYS

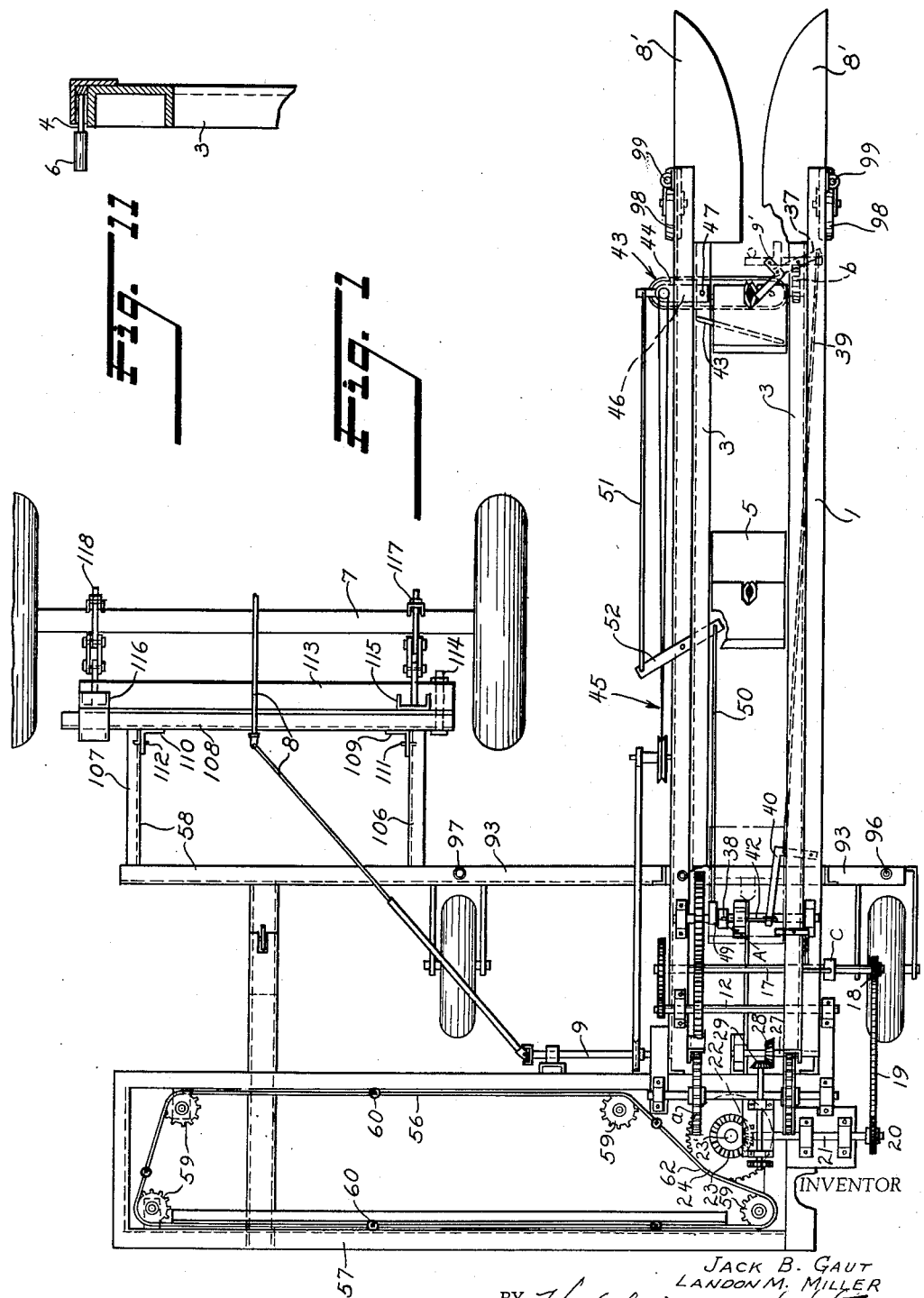

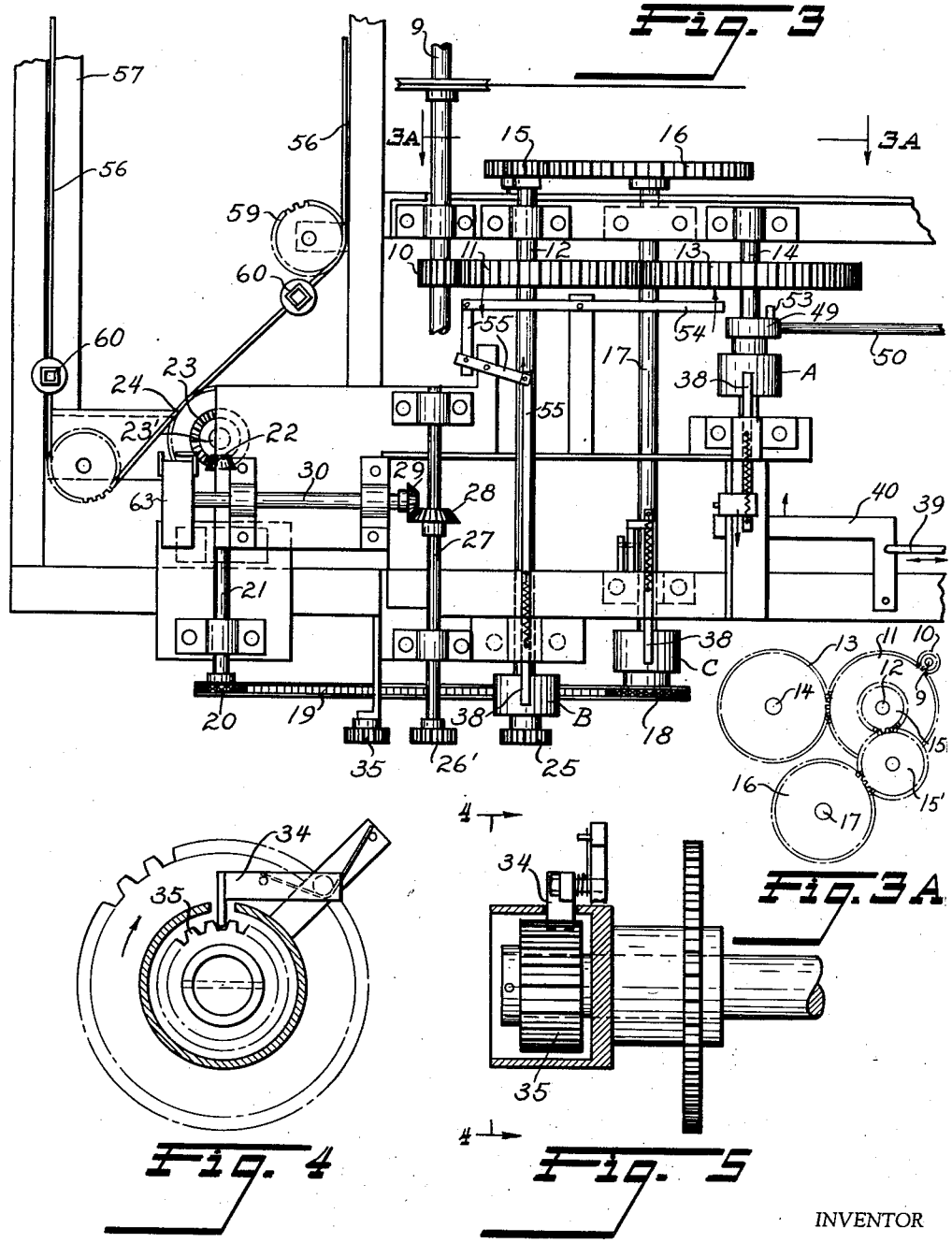

Nov. 2, 1954   J. B. GAUT ET AL   2,693,070
TOBACCO HARVESTER
Filed Jan. 14, 1952   5 Sheets-Sheet 4
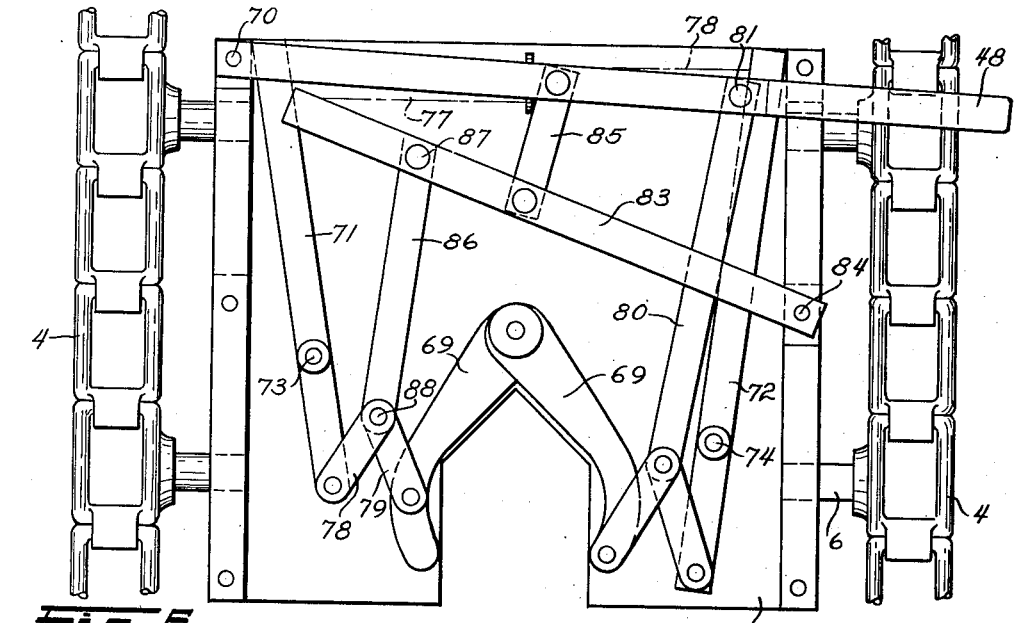
Fig. 6
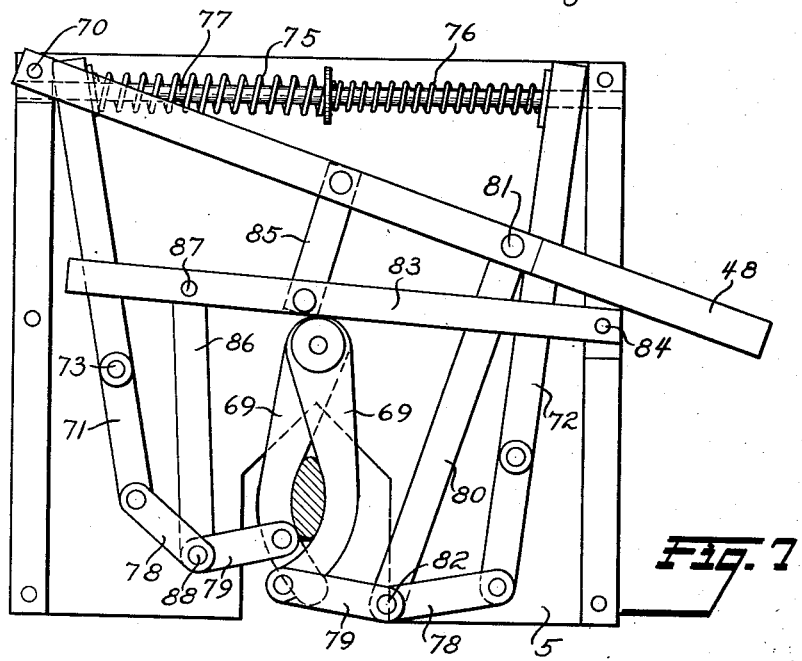
Fig. 7
Fig. 8
INVENTOR
JACK B. GAUT
LANDON M. MILLER
BY Hutchinson & Hutchinson
ATTORNEYS Nov. 2, 1954     J. B. GAUT ET AL     2,693,070
TOBACCO HARVESTER
Filed Jan. 14, 1952     5 Sheets-Sheet 5
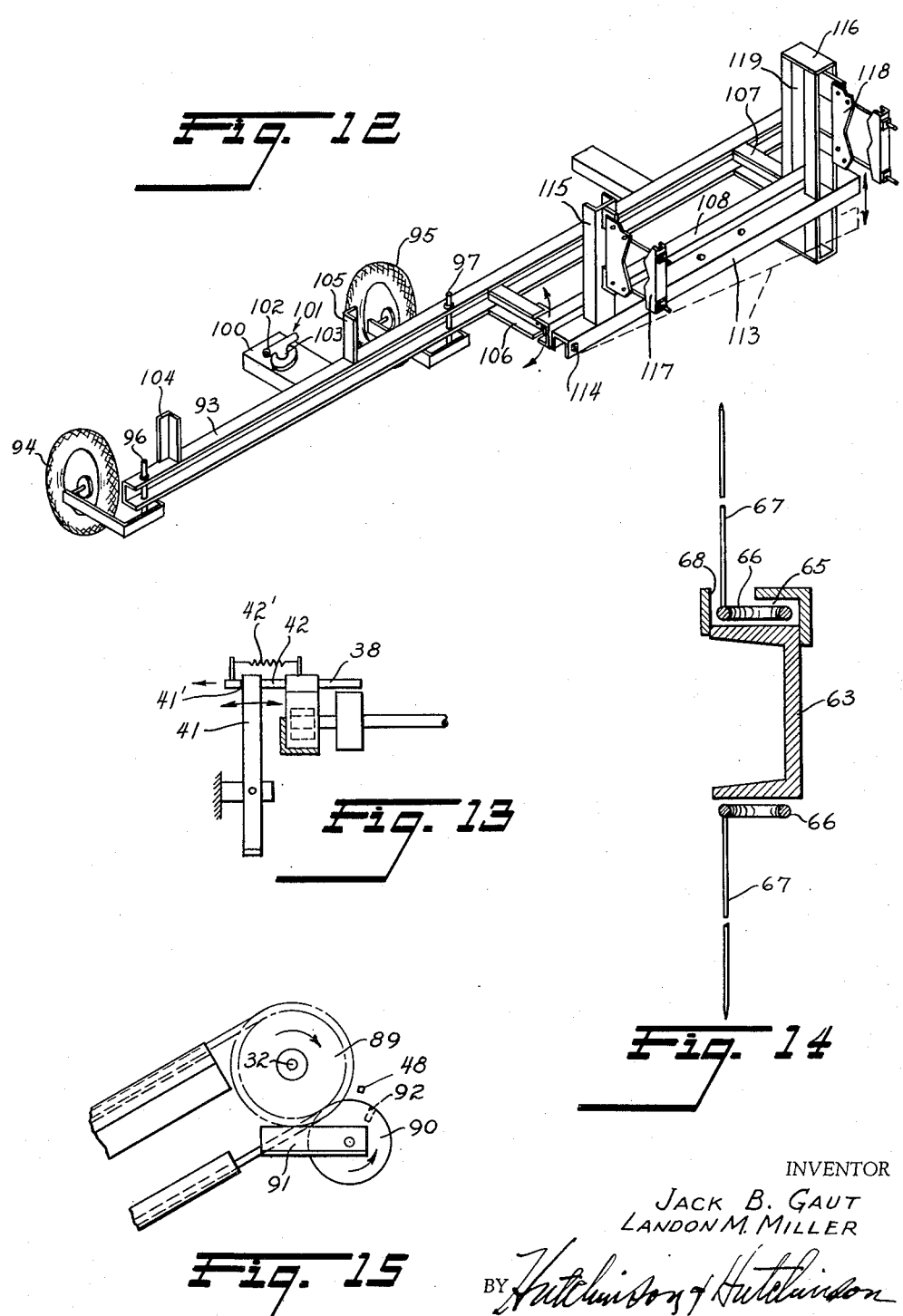
INVENTOR
JACK B. GAUT
LANDON M. MILLER
BY *Hutchinson & Hutchinson*
ATTORNEY

United States Patent Office 2,693,070
Patented Nov. 2, 1954

2,693,070

TOBACCO HARVESTER

Jack B. Gaut, Bulls Gap, and Landon M. Miller, Morristown, Tenn.

Application January 14, 1952, Serial No. 266,324

12 Claims. (Cl. 56—27.5)

This invention relates to harvesting machines and particularly to tobacco harvesters adapted to be drawn or otherwise propelled over the tobacco fields to automatically harvest the tobacco plants by severing the plant stalks near the ground and thereafter conveying the severed plants one after the other to a position where the stalks are pierced and placed on tobacco receiving sticks for subsequent use incident to the drying and curing of the tobacco leaves, the several operations taking place without the plants ever contacting with the soil and without manual operation.

An object of the invention is to construct a machine for harvesting tobacco whereby automatic mechanism is provided for controlling the operation of the stalk severing means and furthermore, and in timed relation therewith, the operation of a series of mechanical "hands" mounted upon an endless chain conveyor and with the foliage portion of the plant maintained in a generally upright condition.

A further object of the invention is the provision of a series of mechanical "hands" arranged in definite spaced relation upon an endless chain conveyor, and with the "hands" so positioned and timed in operation, that when each "hand" arrives at the receiving end of said conveyor and is operated for gripping the stalk of a severed plant, another "hand" at the opposite end of the conveyor is functioning to place its gripped plant on a tobacco stick, properly timed mechanism being brought into play to release the gripped plant from the holding "hand" immediately after the tobacco stick piercing operation, and to thus permit said hand to again return to the receiving end of said conveyor.

Another object of the invention is to provide automatically operated mechanism properly spacing the pierced tobacco plants upon the receiving stick during the intermittent operation of the machine, said mechanism including an endless chain vertically arranged with individual rods or pusher members spaced apart thereon for engaging the stalks of said plants when pierced by the receiving sticks, the endless chain and its pusher members being moved intermittently for the purposes intended and in timed relation to other mechanisms of the machine.

A still further object of the invention is the provision of an indexer endless chain horizontally arranged and provided with sockets for receiving a plurality of individually removable tobacco receiving sticks, one of which is adapted to be held in a fixed position for receiving the desired number of tobacco plants by the piercing operation, and whereby the loaded tobacco stick is moved to a position one step from its receiving station and an empty tobacco stick is brought into position for receiving its required number of tobacco plants by a similar piercing operation.

Another object of the invention is the provision of a tractor propelled machine and with all of its main drive gears and shafts constantly driven by the tractor power take-off shaft, the intermittent operations of all of the essential mechanisms for harvesting the tobacco plants being controlled by three one-revolution clutches which are brought into play by certain mechanism in proper timed relation for connection with the main drive, and for operating in regular succession and intermittently the following mechanisms: the stalk gripping "hand" mechanism; the severing mechanism; the special drive for the endless conveyor chain which carries the gripping "hands"; the endless spacer mechanism for evenly spacing the plants on the piercing sticks; and the piercing stick indexer chain or conveyor for moving a new stick into a receiving position at the proper time and removing the loaded stick to a position where it may be removed from the conveyor.

With these and other incidental objects in view, the invention comprises a carrier or truck upon which are mounted all of the mechanisms for harvesting tobacco while said carrier is propelled by a tractor over the tobacco fields, it being understood that the stalks of growing plants are first severed one at a time and in regular order as they are arranged in rows and the plants conveyed in regular succession by intermittent operation to a position on said carrier where each plant is finally placed upon an impaling stick arranged in proper location for receiving said plants by impaling the stalks of said plants.

Broadly speaking, the invention has particularly in mind the provision of three clutches of similar construction mounted upon the carrier or truck, which together with their individual operating mechanisms control the intermittent operation of the machine, the first of these clutches being brought into play for a single revolution by trip mechanism contacted by the stalk of the growing plant as the machine is propelled over the field, and during such single revolution serves to operate the stalk severing means and also the "hand" gripping means of one of a series of "hands" spaced apart upon an endless conveyor chain, and this for firmly gripping the severed stalk for subsequent movement of the severed plant therewith, whereupon and at the completion of this single revolution of said first mentioned clutch, a second clutch is brought into play through suitable control mechanism for a single revolution for driving the endless chain conveyor upon which a series of said "hands" are arranged in spaced relation as heretofore set forth, which driving operation is of intermittent duration, and serving to move the loaded "hands" step by step to a position where each loaded "hand" in turn deposits its gripped plant upon a piercing stick which pierces the stalk of said plant for retaining the plant until the required number of plants have been so deposited upon a single stick; also during this single revolution of said second clutch an endless chain spacer mechanism is being operated and in proper timed relation, said spacer adapted to contact the stalks of each deposited plant to properly space the same upon the receiving piercing stick until said stick is loaded with the required number of plants (six plants in the embodiment as illustrated) whereupon the loaded stick is ready to be moved to a position where it and the plants thereupon can be removed for subsequent use in the drying or curing process; and thereafter and with the six plants properly pierced upon the holding stick, a single means carried by the endless elevator chain for the "hands", contacts and operates certain mechanism for bringing into play the third one-revolution clutch, and this clutch, through suitable driving mechanism, operates a horizontally arranged endless chain indexer conveyor having a series of spaced sockets for receiving the upstanding piercing sticks, said operation of course being intermittent and in timed relation with the other mechanisms and for placing a new piercing stick in proper position for receiving its six plants as the loaded stick is being moved to a position for removal from its socket on the endless chain in question and as may be desired.

Having thus set forth the objects of the invention and the general operation of the machine, reference may now be had to the accompanying drawings which form part of the application.

In the drawings—

Figure 1 is a top plan elevation of the machine.

Figure 2 is a side elevation of the complete machine.

Figure 3 is an enlarged fragmentary top plan view of a rear portion of the machine showing the drive system for the machine and the control clutches, together with a partial showing of the index endless chain for the piercing sticks.

Figure 3A is a diagrammatic view of the power drive gear arrangement and without supporting structure as viewed looking in the direction indicated by the arrows 3A in Fig. 3.

Figures 4 and 5 are detail views of one of the control clutches, Figure 4 being a sectional view taken along line 4—4 of Fig. 5, and Figure 5 being a sectional view through said control-clutch.

Figures 6 and 7 are enlarged top plan views of the gripping "hand," with the top plate thereof removed, Figure 6 showing the gripping fingers in open position, and Figure 7 showing said gripping fingers in closed or gripping position.

Figure 8 is a side view of the gripping "hand."

Figures 9 and 10 are enlarged detail fragmentary views of the endless chain indexer and the manner in which the sockets for the piercing sticks are attached to said chain.

Figure 11 is an enlarged view with parts broken away and shown in section of a portion of the endless conveyor chain and angle iron guide member.

Figure 12 is an enlarged perspective view of the undercarriage for the machine frame.

Figure 13 is an enlarged view of a portion of the mechanism for operating the pin engaging means incident to clutch A.

Figure 14 is an enlarged view with parts broken away and shown in section of the endless chain spacer and the upright supporting structure to which said spacer is attached, and Figure 15 is an enlarged side elevation of a portion of the upper end of the endless conveyor chain, showing particularly the mechanism for releasing the plant from the gripping fingers of the depositing "hand."

In constructing the machine, there is employed a main frame 1, composed preferably of angle iron upon which is located a superstructure comprising upright angle iron members 2 at the rear of the machine which support at their upper ends a track-way generally indicated at 3 for endless conveyor chains 4, said track-way being inclined from its upper support in a downwardly direction and with the lower end of said track-way fixed to the main frame 1 at the forward end of the machine.

It is to be noted that the inclined track-way 3 is made up of two sections 3a and 3b spaced apart a distance slightly greater than the width of the gripping "hands" 5 to which reference will be made hereinafter, and these sections 3a and 3b are so constructed upon their inwardly directed sides as to provide a guide-way for the endless chains 4, one in each guide-way, and with the gripping "hands" connected to said chains 4 by studs 6, two on each side of each "hand," said "hands" being equally spaced apart on said endless chain conveyor, there being six "hands" illustrated in the present embodiment of the invention.

The gripping "hands" carried by the endless conveyor chains 4 are adapted to be moved intermittently, step by step, from an initial receiving position at the forward end of the machine (see Figs. 1 and 2), to a position at the upper end of the track-way where said "hands" go over the top, so to speak, and operate to place the collected plants one after another upon impaling sticks, as clearly shown in Fig. 2.

It may be well to note at this point that the endless chains 4 (two in number) for the "hand" conveyor travel over large sprockets a at the top of the machine, which sprockets are driven by mechanism to be hereinafter described, and these sprockets serve to drive the endless chains 4 for their intermittent movements. At the forward end of the machine, these endless chains 4 travel over smaller sprockets b as clearly shown in Fig. 2, it being noted in this connection that special provision is made for permitting the "hands" to be carried around these smaller sprockets b by the endless chains 4 traveling on said sprockets. This is accomplished by allowing one of the studs 6 on each side of the chain conveyor to have sliding engagement with the "hand" structure as clearly shown in Fig. 6. This sliding engagement allows for adjustability as between the stud connections on each side of the chain conveyor in a direction toward each other and permitting that portion of the endless chains 4 connected to the "hands" and lying between each pair of stud connections, to buckle sufficiently at that point while traveling around the smaller sprockets b, thus allowing the "hands" to be effectively moved around the smaller sprockets b and then brought to rest for properly positioning a "hand" at the plant-receiving position on the endless chain conveyor.

As has heretofore been pointed out, the harvesting machine is propelled over the tobacco field by a tractor, and this tractor is indicated at 7 in Fig. 1, and the main driving mechanism for the machine is, as will be readily understood, driven by the tractor power take-off shaft as indicated at 8.

As the machine is propelled over the field and toward the tobacco plants as arranged in rows, a gripping "hand" 5 will be located at the receiving end of the machine, and as the machine approaches a plant in any particular row, the stalk of said plant will be guided to a position within the machine by guide members 8', and as the machine continues its forward movement, the stalk of said plant engages a trip 9', which trip operates certain mechanism for putting into play clutch A, the operation of which will be set forth more in detail hereinafter.

At this point, it is desired to trace the main driving mechanism as constantly driven by the tractor power take-off shaft. As heretofore stated, the take-off shaft is indicated at 8, and this shaft is connected by universal joint to a transverse shaft 9 journalled upon the machine. This transverse shaft 9 has keyed thereto a small gear 10 which is in meshing engagement with a larger gear 11 keyed to a transverse shaft 12 also journalled upon the machine. This larger gear 11 meshes with a gear 13 of substantially similar diameter, said gear 13 keyed to another transverse shaft 14 on the machine, and upon which is also loosely mounted a one revolution clutch indicated at A.

Also keyed to shaft 12 at one end thereof is a small gear 15 which is in meshing engagement with a reverse idler gear 15', which last mentioned gear is in meshing engagement with a gear 16 keyed to another transverse shaft 17 and upon which shaft 17 is also loosely mounted a second one-revolution clutch as indicated at C. As will be apparent, the reverse idler gear is provided for the purpose of permitting gears 15 and 16 and the shafts to which they are keyed to revolve or turn in the same direction.

At the opposite end of shaft 17, adjacent the clutch C, is keyed a sprocket 18, and said sprocket drives a sprocket chain 19 which in turn drives a sprocket 20 keyed to a transverse stub shaft 21 journalled at the rear of the machine. This stub shaft 21 has keyed to its other end a bevel gear 22 which drives a somewhat larger bevel gear 23, which last mentioned gear is keyed to a vertically arranged shaft 23' upon which a relatively larger sprocket 24 is also keyed. Said sprocket 24 is for use in providing intermittent operation of the indexer endless chain carrying the piercing tobacco sticks as will hereafter be pointed out in detail, but it is well to note at this time that such intermittent operation is controlled by the operation of clutch C.

The transverse shaft 12, upon the opposite end thereof to that carrying the gear 15, has keyed to said opposite end a sprocket 25, and this sprocket 25 drives a sprocket chain 26 which is arranged in a manner as clearly illustrated in Fig. 2 of the drawing. As will be seen, this sprocket chain drives a sprocket 26' keyed to a stub-shaft 27, which in turn has keyed thereto a bevel gear 28 meshing with a bevel gear 29 keyed to one end of a horizontally arranged stub-shaft 30, (see Fig. 3). This stub shaft 30 has keyed to its opposite end a sprocket 31, which through the drive system just described serves to intermittently drive the endless chain spacer mechanism to which reference will be made later more in detail.

Also driven by the sprocket chain 26 is a sprocket 32 (Fig. 2) keyed to a shaft 32' carrying the two large sprockets a at the top of the machine upon which travel the endless conveyor chain 4, thus functioning to provide the intermittent operation of the endless chain conveyor for the gripping "hands". Incidentally the sprocket 33 (as shown in Figs. 1 and 2), also engaged by the sprocket chain 26, is merely an idle sprocket. It is well to note at this point that there is also loosely mounted on transverse shaft 12 a third clutch B similar in general construction and operation to the clutches A and C referred to above, and it is this clutch B which controls the intermittent operation of the endless chain spacer and also that of the endless chain conveyor for the gripping "hands", both operations, when performed, occurring simultaneously.

Generally speaking, all three clutches A, B and C are loosely mounted upon their individual transverse shafts, and further carry a spring pressed pawl 34 biased in a direction toward the circumferential face of the teeth of a gear 35 keyed to the shaft upon which the clutch is loosely mounted in each instance, and this for the purpose of connecting the clutch in driving relation to the main drive system for one complete revolution for intermittently operating certain mechanisms, suitable means being provided for disconnecting the clutch at the end of a complete revolution, all of which will be pointed out later in more detail. However, it might be well to note at this point that upon the intermittent revolution of clutch A, the stalk severing mechanism and also the gripping fingers of the "hands" are operated; that at the end of a complete operation of clutch A, clutch B is brought into play for operating the "hand" endless chain conveyor for moving the "hands" step by step to their delivery positions, and also for operating the endless spacer chain; and that, when six plants have been placed upon a piercing tobacco stick, a single means 36 carried by the endless conveyor chain for the "hands," at a predetermined point thereon, is brought into play for contacting certain lever and rod devices to bring into play clutch C, which clutch in turn sets in motion the intermittent operation of the index endless chain conveyor carrying the piercing sticks and at the proper time after each stick has been loaded with the required number of tobacco plants.

As should be obvious from what has been set forth above, these three clutches A, B and C, together with certain trip mechanism mounted upon the receiving end of the machine to which reference has been made above, serve to control all intermittent operations of the machine. With such intermittent operations of the machine, and the fact that all intermittent operations are brought into play by the standing stalks of the plants to be harvested, the various operations as herein described are performed in proper time and sequence, and this regardless of the relative location of the plants in their rows. Therefore, upon propelling the machine across a tobacco field, the forward or receiving end of the machine encounters the standing plant stalks one at a time, each stalk guided by guide member 8' to a position where it engages a pivoted trip 9 spring biased in a direction toward the stalk and moved by said stalk for operating certain devices for bringing into play clutch A (see Fig. 2). This spring biased trip 9 is pivoted to a lever 37 which in turn is pivoted intermediate its ends to the machine frame 1 near the receiving end thereof, and as the trip is moved in a backward direction the lever 37 is moved with it and oscillated upon its pivot for operating certain rod and lever mechanism which in turn, when moved, serves to release a spring biased holding pin 38 from normal engagement underneath the clutch pawl (which holds said pawl out of engagement with the teeth of gear 35), to thus permit said pawl to be immediately placed into engagement with the teeth of gear 34 and thus connect said clutch A to the main driving system, and for its single revolution. The rod and lever mechanism consists in part of a rod 39 connected at one end to the oscillating lever 37, and when said lever is oscillated the pull on said rod will be in a direction toward the front of the machine. Also said rod at its other end is connected to an arm of a right-angle lever 40 which is mounted upon a vertical pivot upon the machine frame and oscillates in a horizontal plane as pull on rod 39 is initiated. The other arm of said right-angle lever 40 is pivoted to the lower end of a vertically arranged lever 41 which last mentioned lever is pivoted intermediate its ends to a part of the machine frame, the upper end of said lever 41 adapted to engage a horizontally arranged member 42 carrying at its free end the pin engaging means 38 for holding the clutch pawl 34 in its normal position out of engagement with the teeth of gear 35. This horizontally arranged member 42 with its pin 38 are biased in a direction toward clutch A by spring means 42', and the engagement between the upper end of lever 41 with the spring pressed member 42 is made at a point indicated at 41'.

In each instance, insofar as the clutches A, B and C are concerned, the pawl 34, the gear 35, and the spring biased reciprocating pawl holding pin 38, are identical in general arrangement the only essential difference being in the operating mechanism for withdrawing the holding pin momentarily from its holding position with respect to the pawl. These main parts of clutches A, B and C are clearly illustrated in Figs. 4 and 5 of the drawings. It might be well to state here that the momentary withdrawal of the holding pin 38 from beneath the pawl 34 permits the pawl to drop into engagement with the teeth of the gear 35, and thus allow the clutch member to rotate with the gear 35 for its single revolution. In this connection, and immediately after the pawl is engaged with the teeth of gear 35, the spring pressed holding pin returns to its normal holding position, in which position and when allowed to contact the pawl, it then serves as a wedging means for disconnecting the spring biased pawl from engagement with the teeth of the gear, thus ending the single rotation of the clutch member in question and again performing its pawl holding function.

As the plant stalk performs its function incident to the operation of the trip mechanism and bringing into play clutch A, the stalk encounters a constantly driven chain saw 43 which is carried upon an oscillating member 44 pivotally mounted on the left side of the machine frame near the receiving end of said machine, and normally this saw member lies out of the path of the oncoming plant stalk. In this connection, the chain saw is constantly driven off of shaft 9 by belt and pulley arrangement as indicated generally at 45. At the time an empty "hand" is brought to a stop at the forward end of the machine to receive a plant, this "hand" remains stationary for a moment, and during this moment the saw frame begins its oscillatory movement to position said saw in the path of the on-coming plant stalk. In such position the oncoming plant stalk, when brought into contact with the saw, will be severed, and at approximately the same time the gripping fingers of the "hand" will be closed about the severed stalk by means now to be described. This means comprises a stud member 46 which is rigidly fixed to the saw frame to oscillate therewith, and when oscillated brings into play a stud 47 for contact with an operating lever 48 carried by the gripping "hand," and this to move said lever for closing the gripping fingers around the plant stalk at the time it is severed. Both the movement of the saw frame into the path of the on-coming plant stalk, and the closing of the gripping fingers around the severed plant stalk, occurs at a time when the gripping "hand" is momentarily in a stationary position at the receiving end of the machine as heretofore pointed out. However, when the gripping fingers are closed around the cut plant stalk, then the "hand" starts its intermittent movement, and this before the oscillating saw frame and the stud carrying member start their return stroke out of the path of on-coming plants, and thus preventing any interference between stud 47 and the operating lever 48 of the "hand" during such return stroke. These operations are brought about by one revolution of clutch A and by suitable connections to be described hereinafter. In this connection, as will be noted by reference to Fig. 3, the clutch A is provided with an eccentric crank member 49 which performs the operation of oscillating the saw member 44, the operating connection between the eccentric crank member and the oscillating saw member being in the form of rods 50 and 51, one connected to the eccentric member 49 and the other connected to the saw member 44, and both of said rods at their other ends being connected to a lever 52 pivoted upon the machine frame intermediate its ends, and as clearly shown in Fig. 1. These operations are all performed, of course, at a time when an empty "hand" is in proper position at the front or receiving end of the machine, as clearly shown in Figs. 1 and 2 of the drawing.

The above-mentioned operations being performed by one revolution of clutch A, it will be obvious that a plant stalk has been severed and the plant firmly gripped by the "hand" which was in the receiving position for such purpose. Now at the end of the single revolution of clutch A for the performed purpose, a wedge member 53 mounted upon the eccentric crank member 49 of said clutch, immediately contacts certain mechanism for bringing into play clutch B, and with the purpose in view of ultimately operating the "hand" endless chain conveyor and the endless chain spacer, for their intermittent movements in the operation of the machine. In bringing into play the clutch B, wedge 53 contacts pivoted lever 54 and oscillates said lever upon its pivot, whereby through said lever 54 and its connected levers 55 associated therewith, serves to withdraw momentarily from engagement with the clutch pawl 34, the spring biased pin 38 which normally serves to hold said pawl out of contact with the teeth of gear 35 keyed on the shaft 12 and contained within said clutch member B, similar in essential respects to that set forth with reference to clutch A.

Assuming that the top flight of the "hand" endless chain conveyor contains properly loaded "hands," we have by this last described operation, which immediately follows the severing and gripping operations incident to the "hand" as situated at the receiving end of the machine, moved the "hand" endless chain conveyor its intermittent step, and this for the purpose of not only depositing a plant upon its piercing stick, but also to operate the endless chain spacer to properly space the pierced plant stalks upon the receiving piercing stick, and furthermore, and at the same time have brought an empty "hand" in proper position at the receiving end of the machine for proper loading upon the next operation of said machine.

As has been heretofore stated, in the present embodiment of the invention six "hands" are arranged on the endless chain conveyor and with the idea also in view of having each piercing tobacco stick carry six plants for the purposes intended. Such being the case, means have been provided for moving a completed loaded stick out of its fixed receiving position to a position where said loaded stick may be removed from the machine, and at the same time bring an empty stick to said fixed receiving position. This means is in the form of an endless indexer chain 56, which will now be described in detail.

This endless indexer chain 56 is mounted upon a horizontal transversely extending frame 57 carried at the rear of the machine and located in part behind that part of the machine frame structure 58 which is connected to the tractor, and to which frame 58 the transversely extending frame 57 is also connected. This transversely extending frame 57 has journalled thereon, in the embodiment of the invention shown, four sprockets 59 located as clearly shown in Fig. 1, and the endless indexer chain in question is carried by these four sprockets for travel thereon. Extending upwardly from one side of said endless chain, and equally spaced apart thereon, are a series of comparatively deep socket members 60 for receiving and holding in a steady vertical relation to the endless chain, the piercing sticks to which reference has been made herein, one of said sticks being indicated at 61 in Fig. 2, and also shown in detail within its deep socket 60 in Fig. 9. These socket members 60 and their manner of connection to the endless chain is clearly shown in detail in Figs. 9 and 10 of the drawing where it is seen that said sockets extend upwardly from the top edge of the endless chain. As has heretofore been set forth, the endless chain is driven by the large sprocket 24, and it will be noted in this connection that said sprocket engages the endless chain at the point indicated at 62 in Fig. 1 of the drawing for driving the same.

Now referring specifically to the endless chain spacer, it is desired to call attention to the fact that said spacer is mounted for action upon an upright angle iron 63 carried by the machine frame at the rear thereof and with its upper end fastened to and extension of "hand" conveyor chain frame and at a point indicated at 64. This upright 63 is provided with a channel 65 within which the endless chain 66 of said spacer travels during its intermittent movements, and said channel is located on that side of the upright 63 which faces the plants as they are deposited upon the piercing sticks. Equally spaced apart upon the endless chain 66, are spacer rods 67 projecting outwardly therefrom, an open ended slot 68 being provided upon the channel side of the upright for proper passage of the spacer rods when the endless chain is travelling through the channel 65 of said upright 63. This spacer structure is shown in detail in Fig. 11 of the drawing, and as heretofore set forth, the rods of this endless chain spacer are suitably timed to contact the stalks of the deposited plants on the piercing sticks and move said plants downwardly upon said sticks, and at the same time serving to keep the plants properly spaced upon said sticks for subsequent removal as desired, the rods traveling in a downward direction on the channel side of the upright for the purposes intended. The drive for this endless chain spacer has heretofore been described.

It will now be in order to set forth in detail the several operating parts of the gripping "hand" structure. One of these gripping "hands" with its gripping fingers and operating mechanism, is shown in detail in Figs. 6 and 7, and in this connection the gripping fingers are shown at 69, which fingers are adapted to be moved to their open and closed (or gripping) positions by a system of levers and links operated directly upon movement of the operating lever 48 projecting outwardly from one side of the "hand" frame and arranged in the path of certain control devices for opening and closing the gripping fingers as the "hands" travel with the conveyor chain. As will be noted operating lever 48 is pivoted on the "hand" at pivot point 70 and is adapted to be moved on said pivot from a position shown in Fig. 6 (the open position of the gripping fingers) to a position shown in Fig. 7 (the closed or gripping position of the gripping fingers). Also pivoted on the "hand" are two levers 71 and 72, lever 71 pivoted intermediate its ends at pivot point 73, and lever 72 pivoted intermediate its ends at pivot point 74. Interposed between the ends of these two levers at the forward end of the "hand" are spiral expansion springs 75 and 76 carried by a transverse rod 77 fixed to the "hand" frame, which springs tend to maintain these ends of said levers under spring action, in the spread relation illustrated in Fig. 7. Between the other end of each of the levers 71 and 72, and one of the gripping fingers 69, is pivotally connected a link member made up of two parts 78 and 79 which are also pivotally connected one to the other in each instance and in their movements for operating the gripping fingers are adapted to be placed in off-center positions under spring action for holding the gripping fingers firmly in either their closed or open positions, the off-center position of said dual link members 78—79 for holding the gripping fingers in open position being shown in Fig. 6, and the off-center position of said dual link members for holding the gripping fingers in closed or gripping position being shown in Fig. 7.

The dual link members 78—79 shown on the right in Figs. 6 and 7 is operated directly by operating lever 48 through a long connecting link member 80 pivoted thereto at one end of said link at pivot point 81, and with the other end of said link member 80 pivoted at the pivotal point 82 between the two part link member. The dual link member 78—79 as shown on the left in Figs. 6 and 7, however is operated by slightly different mechanism, although controlled by the same operating lever 48 when operating the dual link member on the right side of the "hand." In this connection there is provided a second operating lever 83 pivoted to the "hand" frame at pivot point 84, which second operating lever 83 is operated by operating lever 48, being connected thereto by means of link 85 and therefore moved simultaneously with the movement of operating lever 48 when operated. As clearly shown in Figs. 6 and 7, this second operating lever is connected to one end of a link 86 at pivot 87, which link 86 at its other end is pivoted at the pivot point 88 between the two part link member 78—79 on the left side of the "hand" frame. It will thus be seen that effective operating means is provided for throwing both dual link members 78—79 off-center for the purposes intended. It is also well to note that the gripping fingers will accommodate themselves to stalks of different diameter, and with the mechanism just described, the spiral springs 75 and 76 allowing the operating lever and link system to adjust itself to every situation within limits, said adjustments being made according to the diameter of the plant stalks when contacting the gripping fingers, it being understood that in each existing adjustment situation the dual-link members, under spring action, are held in off-center positions for firmly holding the gripping fingers in either closed or open relation. Further, it is well to bear in mind that the pivotal connecting point between gripping fingers 69 serves as a stop and limits the throw of secondary operating lever 83 when moving in the direction to close said gripping fingers, thereby permitting the gripping fingers and their connecting link members to have free movement under spring tension in adjusting themselves to stalks of different diameters, as mentioned herein.

As has heretofore been pointed out, the transverse shaft 32', journalled upon the machine frame at the top thereof, carries the two large sprockets upon which travel the endless conveyor chains 4, and as heretofore set forth, these large sprockets are indicated at a, being keyed to said transverse shaft 32'. Also keyed to the shaft 32' is a gear 89, and this gear 89 is in meshing engagement with gear 90 journalled upon an extension arm 91 of the machine frame structure at the top thereof. Said last-mentioned gear 90 has, on its inner side face, an operating stud member 92, which, during intermittent operations of the machine, travels in a circular path, and once in every complete revolution is adapted to contact the outwardly projecting end of the operating lever 48 of a "hand" as said "hand" is depositing a plant upon the piercing stick, said mechanism being so timed as to bring about the piercing operation and also the movement of the operating lever 48 for releasing the plant from the "hand" in question, in which last-mentioned operation the gripping fingers of said "hand" are moved to their open position, and the empty hand then returned step by step to its receiving position for receiving another plant in the manner as heretofore described.

The rear under-carriage for supporting the machine and permitting the same to be propelled over the tobacco field in the discharge of its harvesting function, is shown in Figs. 1 and 12 of the drawings, and wherein 93 represents the main supporting girder mounted upon two caster wheels 94 and 95 pivoted to said girder at the points 96 and 97 on opposite sides of the main machine frame structure. These two castor wheels 94 and 95 as pivoted to the main supporting girder in the manner just described, along with the wheels 98 mounted at the forward part of the machine frame, serve as the supporting under-carriage for the main machine structure and enable the same to be properly propelled over the ground. In this connection, it is to be noted that the wheels 98 are pivoted for their movement directly upon the main machine frame 1 at the vertical pivot points indicated at 99 in Fig. 2 of the drawings.

Extending rearwardly from the main supporting girder 93, and at a point approximately midway between the two castor wheels 94 and 95, is a relatively short arm support 100 upon which is mounted the universal pivot member generally indicated at 101. At this point and upon said pivot member 101, the entire rear end of the main machine frame structure is supported, said universal pivot member 101 not only providing for limited free movement of the under carriage with respect to the main machine structure upon a horizontal pivot 102, but also upon a vertical pivot 103, and this to permit the under-carriage to adapt itself to uneven ground conditions while traveling over the tobacco field and without materially affecting the steadiness of harvesting machine structure during its various operations.

Such a universal mounting of the main machine frame structure upon the supporting girder structure of the under-carriage allows for a limited lateral swinging movement of the under-carriage upon vertical pivot 103, as well as limited up and down rocking movement of said under-carriage as the machine is drawn over the tobacco field, thus permitting the machine structure as a whole, and including the under-carriage to accommodate itself within limits to irregular ground surface conditions during the operation of the machine.

As a means for limiting lateral swinging movement of the under-carriage with respect to the main machine frame, spaced apart stops 104 and 105 are rigidly mounted upon the girder 93, as clearly shown in Fig. 12, said stops being vertically arranged upon said girder and adapted to abut the sides of the main machine frame 1 to limit this sidewise swinging movement of the under-carriage.

As will be noted particularly from Fig. 1, the main supporting girder 93 is extended in a direction laterally of the machine and to a position to lie directly behind the tractor which will propel the machine over the tobacco field. This extended portion of girder 93 has spaced apart forward extending frame members 106 and 107, arranged at right angles thereto, and to the free ends of said frame members 106 and 107 is pivoted a frame member 108 paralleling the extended portion of girder 93, angle irons 109 and 110 being provided for making the pivoted connection and the pivot points being shown at 111 and 112, respectively.

The extended portion of the girder 93, together with the frame members 106, 107 and 108 constitute a machine frame structure adapted to lie directly behind the propelling tractor when coupled thereto, it being noted that frame member 108 with its pivotal connections heretofore described allows for relative limited up and down rocking movement of the other frame members 106 and 107 and the girder 93 with respect to said frame member 108 and for the purposes intended.

A clamp carrying member 113 is horizontally arranged alongside of the pivoted frame member 108, said clamp carrying member at one end thereof being pivoted to said frame member 108 at the pivot point 114, thus providing for a limited up and down movement of the member 113 upon said pivot 114. Spaced apart angle iron members 115 and 116 are vertically arranged upon this clamp carrying member 113, and to which they are rigidly secured. Clamps 117 and 118 are directly connected to these angle iron members 115 and 116 as clearly shown in Fig. 12, and said clamps are adapted to be connected to the rear axle of the tractor to make the proper coupling of the tractor to the harvesting machine frame structure. It is further to be noted that the angle iron member 116 is so constructed and arranged to extend below the clamp carrying member 113, and as constructed (see Fig. 12) provides for a guideway 119 within which the free end of pivoted frame member 108 is adapted to slide. It will thus be seen that with the pivotal connections between the several members as heretofore described, the under-carriage, including its laterally extending frame structure, is adapted for various limited movements not only with respect to the main machine frame, but also as to the propelling tractor when in its coupled relation.

While no showing is made in the accompanying drawings, it is highly desirable to equip the harvesting machine with suitable shields which will protect the severed plants from injury throughout their entire travel upon the machine. These shields will provide a smooth sliding surface for the leaves of the tobacco plants and prevent said leaves from being snagged or torn. In this connection, the guide members 8' at the forward end of the machine are smoothly rounded members and serve to guide the machine down the tobacco row and serve to raise the leaves of the plant as it enters the machine. Continuing from these smooth surfaced guide members, shields should be provided extending all along both sides of the endless chain conveyor, so that the tobacco leaves may be protected throughout their passage through the machine and at •least up to the time the tobacco plants are placed upon their receiving sticks.

We claim:

1. In a harvesting machine, a travelling main frame, a main driving mechanism continuously in motion during travel of the machine, intermittently operated plant conveyor means extending from the plant receiving or forward end of the machine to a plant depositing station at the rear of the machine, said conveyor means having spaced apart thereon tobacco plant gripping hands which are moved step by step by the intermittent operation of said conveyor toward the depositing station, a tobacco piercing stick vertically arranged adjacent the depositing station and in cooperative relation to the conveyor means, means mounted upon the forward end of the machine for loading a gripping hand with a tobacco plant while maintaining said gripping hand in stationary position for receiving the plant, means for thereafter operating said conveyor means for moving said loaded hand one step in its travel toward the depositing station at the rear of the machine, and means located at the rear of the machine for depositing a tobacco plant upon the piercing stick on arrival of a loaded hand at said depositing station and during an intermittent operation of the conveyor means.

2. In a harvesting machine, a travelling main frame, a main driving mechanism continuously in motion during travel of the machine, intermittently operated plant conveyor means extending from the plant receiving or forward end of the machine to a plant depositing station at the rear of the machine, said conveyor means having spaced apart thereon tobacco plant gripping hands which are moved step by step by the intermittent operation of said conveyor toward the depositing station, a tobacco piercing stick vertically arranged adjacent the depositing station and in cooperative relation to the conveyor means, means mounted upon the forward end of the machine for loading a gripping hand with a tobacco plant while maintaining said gripping hand in stationary position at said machine forward end, means for immediately thereafter connecting the conveyor means with the main driving mechanism for an intermittent movement of the conveyor means, said conveyor means during such intermittent movement positioning a loaded gripping hand at the rear of the machine for depositing the tobacco plant gripped thereby upon the piercing stick at the said depositing station, and means carried by the machine frame for releasing the gripping action upon the plant carried by said loaded hand as said plant is deposited upon said piercing stick, all of which is controlled during a single intermittent operation of the machine.

3. In a harvesting machine, a travelling main frame, a main driving mechanism continuously in motion during travel of the machine, intermittently operated conveying mechanism extending from the plant receiving or forward end of the machine to a plant depositing station at the rear of the machine, said conveying mechanism having spaced apart thereon tobacco plant gripping hands which are moved step by step by the intermittent operation of said conveyor toward the depositing station, a tobacco piercing stick vertically arranged adjacent the depositing station and in cooperative relation to the conveying mechanism, controlled mechanism for loading a gripping hand with a tobacco plant at the forward or receiving end of the machine and at the same time depositing a gripped tobacco plant upon the piercing stick at the rear of the machine, means carried by the machine frame for releasing the gripping action upon each plant carried by each hand as said plant is deposited upon the piercing stick, and plant spacer means contacting each plant stalk as the plants are deposited upon the piercing sticks and serving to move each plant downwardly upon the sticks and maintain the plants properly spaced apart thereon during the loading of each piercing stick, all of which is controlled during a single intermittent operation of the machine.

4. In a harvesting machine, a travelling main frame, a main driving mechanism continuously in motion during travel of the machine, intermittently operated conveyor means extending from the plant receiving or forward end of the machine to a plant depositing station at the rear of the machine, said conveyor means having spaced apart thereon tobacco plant gripping hands which are moved step by step by the intermittent operation of said conveyor toward the depositing station, a tobacco piercing stick vertically arranged adjacent the depositing station and in cooperative relation to the conveyor means, means for loading a gripping hand with a tobacco plant at the forward or receiving end of the machine and at the same time depositing a gripped tobacco plant upon the piercing stick at the rear of the machine, means carried by the machine frame for releasing the gripping action upon the plant carried by the hand as said plant is deposited upon the piercing stick, and an endless chain spacer vertically arranged at the rear of the machine adjacent the piercing stick at the depositing station, said spacer having outwardly projecting rods spaced apart thereon, each rod in its regular turn adapted to contact the stalk of a deposited plant to move it downwardly on the piercing stick and maintain the plants deposited thereon properly spaced apart during an intermittent operation of the machine.

5. In a harvesting machine, a travelling main frame, a main driving mechanism continuously in motion during travel of the machine, intermittently operated conveying mechanism extending from the plant receiving or forward end of the machine to a plant depositing station at the rear of the machine, said conveying mechanism having spaced apart thereon tobacco plant gripping hands which are moved step by step by the intermittent operation of said conveyor toward the depositing station, a horizontally arranged piercing stick conveyor mounted upon the lower part of the main frame at the rear thereof and adapted for intermittent step by step operation under certain conditions, a series of piercing sticks spaced apart upon said last mentioned conveyor and extending upwardly therefrom, means for maintaining one of said piercing sticks in fixed position adjacent the rear end of the gripping hand conveying mechanism for receiving the tobacco plants to be deposited by said gripping hands, driving mechanism for said piercing stick conveyor, means for connecting said driving mechanism to the main drive system when the piercing stick at the receiving position for said stick has received its quota of tobacco plants, and a single device carried by the gripping hand conveying mechanism for controlling such operation, said single control device being brought into play periodically after a predetermined series of intermittent operations of the gripping hand conveyor, whereby said piercing stick conveyor is given its intermittent operation and the loaded piercing stick thereon is removed from its plant receiving position and replaced by an empty stick at such position.

6. In a harvesting machine, a travelling main frame, a main driving mechanism continuously in motion during travel of the machine, intermittently operated conveying mechanism extending from the plant receiving or forward end of the machine to a plant depositing station at the rear of the machine, said conveying mechanism having spaced apart thereon tobacco plant gripping hands which are moved step by step by the intermittent operation of said conveyor toward the depositing station, a horizontally arranged piercing stick conveyor mounted upon the lower part of the main frame at the rear thereof and adapted for intermittent step by step operation under certain conditions, a series of piercing stick sockets spaced apart upon said last mentioned conveyor and extending upwardly therefrom, a tobacco piercing stick removably carried in each socket, means for maintaining one of said sockets and its piercing stick in fixed position adjacent the rear end of the gripping hand conveying mechanism for receiving the tobacco plants to be deposited by said gripping hands, means for intermittently operating the piercing stick conveyor in a horizontal direction to thereby move a loaded stick from its fixed receiving position to a position where said stick and its deposited tobacco plants may be removed from its socket, clutch operating means along the travel of the gripping hand conveyor adapted when contacted to connect the piercing stick conveyor to the main driving mechanism for a single intermittent operation, and a control device carried by the gripping hand conveyor and adapted to contact said clutch operating means after a predetermined series of intermittent operations of the gripping hand conveyor for the purposes intended, whereby a piercing stick when loaded may be removed from its tobacco plant receiving position and replaced by an empty piercing stick during the intermittent operation of the piercing stick conveyor.

7. In a harvesting machine, a travelling main frame, a main driving mechanism continuously in motion during travel of the machine, an intermittently operated endless chain conveyor made up of two endless sections each travelling on a track-way carried by the main machine frame, spaced apart plant gripping hands carried by said conveyor and interposed between the two endless chain conveyor sections, each gripping hand on each side thereof connected to the chain sections at two points on each section, one of the connections on each side of the gripping hands having sliding engagement with said gripping hand structure, a set of sprockets at each end of the machine frame upon which the endless conveyor chains travel, and mechanism for connecting one set of sprockets to the main drive mechanism for intermittent operation of the endless conveyor chain, the sliding connection between the hands and the endless chains on each side of said hands permitting adjustability between each pair of gripping hand connections in a direction toward one another to thereby buckle that portion of the endless chain sections lying between each pair of said connections, whereby the endless chains have an adjusting buckling action necessary for carrying the gripping hands around the sprockets at the forward end of the machine to effectively move and position each hand at its plant receiving station.

8. In a harvesting machine, a traveling main frame, a main driving mechanism continuously in motion by suitable power means during all operations of the machine, a severing device continuously operated from said power means for severing purposes, said severing device mounted upon an oscillatory frame located upon the main frame at the plant receiving end thereof and adapted to be moved intermittently into the path of the plant stalks for severing purposes as they are encountered during machine travel, means for oscillating the severing device frame during each intermittent operation of the machine for its severing operation, intermittently operated conveyor mechanism extending from the plant receiving or forward end of the machine for moving the severed plants when collected thereon step by step upon the machine, spaced apart gripping hands carried by said conveyor mechanism and with one of said gripping hands normally positioned at the forward end of the machine for receiving a single tobacco plant as the machine approaches said plant for severing purposes, means carried by the oscillatory severing device frame for operating each gripping hand for gripping a plant when said oscillatory frame is moved into the path of a plant for severing purposes and while the gripping hand is held in stationary position, a trip device operated by engagement with a standing stalk of the plant to be harvested for operatively connecting the severing frame oscillating means to the main drive for the intermittent operation of said severing frame to thereby perform the gripping and severing operation incident to each standing stalk as encountered, and means brought into play immediately after the gripping and severing operation for connecting the conveyor mechanism to the main drive for its intermittent operation in moving the conveyor mechanism in carrying the gripped and severed plant one step toward the rear of the machine, and at the same time bringing an empty hand to a stationary position at the receiving end of the machine for similar operations.

9. In a harvesting machine, a traveling main frame, a main driving mechanism continuously in motion during travel of the machine, a severing device continuously operated for severing purposes, said severing device mounted upon an oscillatory frame located upon the main machine frame at the plant receiving end thereof and adapted to be moved intermittently into the path of the plant stalks for severing the same as they are encountered during machine travel, an endless chain conveyor adapted for intermittent operation during travel of the machine, said conveyor extending from the plant receiving or forward end of the machine for receiving and moving the plants as severed step by step in a direction toward the rear of the machine, spaced apart gripping hands carried by said conveyor and with one of said gripping hands normally positioned at the forward end of the machine for receiving and gripping a standing tobacco plant as the machine approaches said plants one after the other for severing purposes, means for oscillating the severing device frame, means for connecting said frame oscillating means to the main drive for an intermittent operation of said frame into and out of the path of the plant stalks to be encountered, a trip device operated by engagement with the standing stalk of the plant to be harvested, said device when tripped by said stalk serving to initiate the operation of said connecting means and place the main drive in driving relation with said severing device frame oscillating means for the said intermittent operation of the severing device frame, means carried by said oscillating severing device frame for operating the gripping hand to firmly grip a plant stalk as said oscillating frame is moved into the path of the plant to be encountered for severing purposes, the return stroke of the oscillating frame out of the path of the plant stalks to be encountered occurring while the loaded hand at the receiving end of the machine is held stationary, and means for immediately thereafter connecting the chain conveyor to the main drive for moving the said loaded hand one step in its intermittent travel and at the same time placing an empty hand in stationary position at the receiving end of the machine for similar operations.

10. A tobacco harvesting machine comprising a mobile frame for movement through a field of standing plant crops, a main driving mechanism carried by said machine and continuously in motion from a power source during machine operation, a severing device continuously operated by said power driving mechanism for severing purposes, said severing device mounted upon an oscillatory frame located upon the machine frame at one side of the plant receiving end thereof and with the frame adapted to be moved intermittently into the path of each standing plant stalk one after the other for severing purposes as they are encountered during machine travel, an intermittently operated endless conveyor extending from the plant receiving end of the machine frame to a point at the rear thereof, spaced apart gripping hands carried by said endless conveyor for receiving and gripping the plant stalks as severed and for subsequent movement of the loaded hands toward the rear end of said machine frame by step by step intermittent operation, said gripping-hands being so spaced upon the endless conveyor that when the conveyor is at rest between said intermittent operations one of said gripping-hands assumes a position at the plant receiving end of the machine frame adjacent the severing device frame and with its gripping fingers in open position for receiving a plant stalk as severed, means carried by the oscillating severing device frame for coacting with part of the gripping-hand mechanism for closing said gripping fingers about a plant stalk when said last mentioned frame is oscillated for severing purposes, a first one revolution clutch member adapted to be connected to the power drive mechanism for an intermittent operation of the machine, an eccentric crank member rotating with said first clutch member and serving during its single rotation to oscillate the severing device frame for its intermittent severing operation, a trip device located at the plant receiving end of the machine frame and adapted to be engaged by each standing plant stalk as encountered for operatively connecting said first one revolution clutch to the power driving mechanism to initiate the intermittent severing operation incident to each standing stalk encountered by said trip device, the trip device performing such clutch connecting operation by positive action through machine elements connected to and extending between said trip device and said first one revolution clutch member, a second one revolution clutch member loosely mounted upon a shaft of the main power drive mechanism, means for connecting said second clutch member to the power drive for the intermittent operation of the endless conveyor, and means carried by the eccentric crank member for operating the last mentioned clutch connecting means, said last mentioned operating means brought into play at the end of the single revolution of the eccentric crank member and immediately after the plant severing and gripping operations, all of said intermittent operations being performed in timed relation one to the other and incident to each plant harvested.

11. A tobacco harvesting machine comprising a mobile frame for movement through a field of standing plant crops, a main driving mechanism carried by said machine and continuously in motion from a power source during machine operation, a severing device continuously operated by said power driving mechanism for severing purposes, said severing device mounted upon an oscillatory frame located upon the machine frame at one side of the plant receiving end thereof and with the frame adapted to be moved intermittently into the path of each standing plant stalk one after the other for severing purposes as they are encountered during machine travel, an intermittently operated endless conveyor extending from the plant receiving end of the machine frame to a point at the rear thereof, spaced apart gripping hands carried by said endless conveyor for receiving and gripping the plant stalks as severed and for subsequent movement of the loaded hands toward the rear end of said machine frame by step by step intermittent operation, said gripping-hands being so spaced upon the endless conveyor that when the conveyor is at rest between said intermittent operations one of said gripping-hands assumes a position at the plant receiving end of the machine frame adjacent the severing device frame and with its gripping fingers in open position for receiving a plant stalk as severed, means carried by the oscillating severing device frame for coacting with part of the gripping-hand mechanism for closing said gripping fingers about a plant stalk when said last mentioned frame is oscillated for severing purposes, a first one revolution clutch member adapted to be connected to the power drive mechanism for an intermittent operation of the machine, an eccentric crank member rotating with said first clutch member and serving during its single rotation to oscillate the severing device frame for its intermittent severing operation, a trip device located at the plant receiving end of the machine frame and adapted to be engaged by each standing plant stalk as encountered for operatively connecting said first one revolution clutch to the power driving mechanism to initiate the intermittent severing operation incident to each standing stalk encountered by said trip device, the trip device performing such clutch connecting operation by positive action through machine elements connected to and extending between said trip device and said first one revolution clutch member, a second one revolution clutch member loosely mounted upon a shaft of the main power drive mechanism, means for connecting said second clutch member to the power drive for the intermittent operation of the endless conveyor, means carried by the eccentric crank member for operating the last mentioned clutch connecting means, said last mentioned operating means brought into play at the end of the single revolution of the eccentric crank member and immediately after the plant severing and gripping operations, a tobacco plant piercing stick vertically arranged adjacent the rear end of the endless gripping-hand conveyor and positioned for piercing the stalk of a severed plant carried by said conveyor during each intermittent operation of the machine, an endless chain spacer mechanism also mounted for intermittent operation at the rear of the machine and in cooperative relation with the piercing stick for contacting each plant stalk as the plants are deposited upon said piercing stick and thus serving to move each plant downwardly upon the piercing stick to maintain the plants properly spaced apart thereon during the loading of said piercing stick, said second one revolution clutch controlling not only the intermittent operation of the endless gripping-hand conveyor but also and at the same time controlling the intermittent operation of the endless chain plant spacer, whereby during intermittent operation of the endless gripping-hand conveyor a plant is deposited upon the piercing stick and the spacer mechanism simultaneously operated to properly position each deposited plant upon said piercing stick.

12. A tobacco harvesting machine comprising a mobile frame for movement through a field of standing plant crops, a main driving mechanism carried by said machine and continuously in motion from a power source during machine operation, a severing device continuously operated by said power driving mechanism for severing purposes, said severing device mounted upon an oscillatory frame located upon the machine frame at one side of the plant receiving end thereof and with the frame adapted to be moved intermittently into the path of each standing plant stalk one after the other for severing purposes as they are encountered during machine travel, an intermittently operated endless conveyor extending from the plant receiving end of the machine frame to a point at the rear thereof, spaced apart gripping-hands carried by said endless conveyor for receiving and gripping the plant stalks as severed and for subsequent movement of the loaded hands toward the rear end of said machine frame by step by step intermittent operation, said gripping-hands being so spaced upon the endless conveyor that when the conveyor is at rest between said intermittent operations one of said gripping-hands assumes a position at the plant receiving end of the machine frame adjacent the severing device frame and with its gripping fingers in open position for receiving a plant stalk as severed, means carried by the oscillating severing device frame for coacting with part of the gripping-hand mechanism for closing said gripping fingers about a plant stalk when said last mentioned frame is oscillated for severing purposes, a first one revolution clutch member adapted to be connected to the power drive mechanism for an intermittent operation of the machine, an eccentric crank member rotating with said first clutch member and serving during its single rotation to oscillate the severing device frame for its intermittent severing operation, a trip device located at the plant receiving end of the machine frame and adapted to be engaged by each standing plant stalk as encountered for operatively connecting said first one revolution clutch to the power driving mechanism to initiate the intermittent severing operation incident to each standing stalk encountered by said trip device, the trip device performing such clutch connecting operation by positive action through machine elements connected to and extending between said trip device and said first one revolution clutch member, a second one revolution clutch member loosely mounted upon a shaft of the main power drive mechanism, means for connecting said second clutch member to the power drive for the intermittent operation of the endless conveyor, means carried by the eccentric crank member for operating the last mentioned clutch connecting means, said last mentioned operating means brought into play at the end of the single revolution of the eccentric crank member and immediately after the plant severing and gripping operations, a horizontally arranged piercing stick conveyor mounted upon the lower part of the main machine frame at the rear thereof and adapted for intermittent step by step operation, a series of piercing sticks spaced apart upon said last mentioned conveyor and vertically arranged thereon, one of said piercing sticks maintained for a period of time in fixed plant receiving position adjacent the rear end of the gripping-hand conveyor mechanism for receiving a predetermined number of tobacco plants to be deposited thereon by said gripping-hands, means cooperating with each gripping-hand in regular turn during each intermittent operation of the gripping hand conveyor for depositing a severed plant upon a piercing stick while maintained in its receiving position, a third one revolution clutch member loosely mounted upon a shaft of the main power drive mechanism, means for connecting said third clutch member to said power drive mechanism, and a single device carried by the endless gripping-hand conveyor for operating said last mentioned clutch connecting means to thereby connect the piercing stick conveyor to the power drive for its intermittent operation and at a time immediately after each piercing stick has deposited thereon its predetermined number of tobacco plants, whereby upon the proper loading of each piercing stick and during the single revolution of said third clutch member the piercing stick conveyor is operated to remove a loaded piercing stick from its fixed receiving position and at the same time move an empty piercing stick to the receiving position for a similar series of plant depositing operations.

References Cited in the file of this patent

UNITED STATES PATENTS

| Number | Name | Date |
|---|---|---|
| 1,323,404 | Motter et al. | Dec. 2, 1919 |
| 1,710,129 | Whitnall | Apr. 23, 1929 |
| 1,841,683 | Stockly | Jan. 19, 1932 |
| 1,864,114 | Angerpointner | June 21, 1932 |
| 2,319,281 | Winters | May 18, 1943 |
| 2,477,068 | La Motte | July 26, 1949 |
| 2,544,925 | Karlsson et al. | Mar. 13, 1951 |
| 2,569,736 | Snyder | Oct. 2, 1951 |